Patented June 27, 1950

2,512,608

UNITED STATES PATENT OFFICE 2,512,608

SYNTHESIS CATALYST

Fred J. Buchmann, Baton Rouge, La., assignor to Standard Oil Development Company, a corporation of Delaware No Drawing. Application November 8, 1946, Serial No. 708,795

1 Claim. (Cl. 252—466)

The present invention is concerned with improved catalysts and relates particularly to improved hydrocarbon synthesis catalysts. The invention is especially concerned with a method of producing hydrocarbon synthesis catalysts which are highly resistant to disintegration due to carbon formation in hydrocarbon synthesis reactions. In accordance with the present invention a thin metal coating of a metal catalyst selected from the group consisting of iron, cobalt or nickel is firmly placed on a relatively impervious, non-carbiding base material resulting in a catalyst of excellent attrition characteristics.

It is well known in the art to conduct hydrocarbon synthesis reactions by contacting hydrogen and oxides of carbon with catalysts under various temperature and pressure conditions. The catalyst employed is usually selected from the iron group metals, as for example, iron, cobalt and nickel. The catalysts are utilized either alone or are employed in conjunction with carriers, such as kieselguhr, diatomaceous earth, synthetic gel, silica, and alumina. Promoters, such as oxides and salts of sodium, potassium, chromium, zinc, aluminum, magnesium, and the rare earth metals are used with the iron group metals. These catalysts are employed in either fixed bed or fluid catalyst operations.

The temperatures employed in the synthesis reaction vary widely, as for example, in the range from about 300° F. to about 800° F. and are generally in the range from about 350° F. to about 750° F. The pressures, likewise, vary considerably and are a function of other operating conditions, such as catalyst employed, activity of the catalyst, character of the feed gases and the temperature utilized. Pressures in the range from about 1 to 100 and higher atmospheres have been suggested. Satisfactory pressures are in the range from about 50 pounds to 750 pounds per square inch. The character of the feed gases introduced into the synthesis reaction zone depends somewhat on the particular temperatures and pressures, and upon the catalyst employed. For example, when employing cobalt type catalyst, it is preferred to use about 1 mol of carbon monoxide to about 2 mols of hydrogen, while when an iron catalyst is utilized, the mol ratio of hydrogen to carbon monoxide in the range from about 1/4 to 4/1 is desirable.

The synthesis gases comprising hydrogen and carbon monoxide are produced by various procedures. Methane or natural gas may be oxidized with a reducible metal oxide, with pure oxygen or with gases comprising oxygen. Other feed stocks may comprise coal, shale and other hydrocarbons. The reaction may be conducted in a single or in a plurality of stages. For example, one procedure is to employ a two-stage reforming process using methane, steam and carbon dioxide for the production of carbon monoxide and hydrogen. When employing methane as feed gas and reducing the same with a reducible metal oxide, the reactions are generally conducted at temperatures in the range from about 1400° F. to about 2000° F. When the synthesis gases are produced by utilizing oxygen and natural gas, the temperatures in the reaction zone are usually in the range from about 2000° F. to about 3000° F.

It has, heretofore, been known in the art to contact gases and solids by passing the gases upwardly through an enlarged treating zone, containing a body of finely divided solids to be contacted, at a controlled velocity to maintain the solids in the treating zone in quasi-liquid state. Under properly controlled conditions, the subdivided solid particles are not only maintained in a highly turbulent, quasi-liquid and ebullient state, but there exists a rapid and overall circulation of the fluidized solids throughout the fluid bed.

Processes of this character, wherein fluidized solids are contacted with gases, have a number of inherent and important advantages. For example, intimate contact between the gases and the fluid subdivided solids is secured. It is also possible to maintain a substantially uniform temperature throughout the bed as a result of the extremely rapid transfer of heat from one section of the bed to the other because of the rapid circulation of the fluid subdivided solids. Furthermore, due to the rapid transfer of heat between the solids under these conditions, it is possible to readily add or extract heat from the mass at an extremely rapid rate. In these fluidized reactions the small subdivided solids or catalysts usually have a particle size in the range from about 0 to 200 microns and higher. These particles are suspended in a fluid ebullient state by means of the upflowing suspending gases, the velocity of which varies in the general range from about 0.1 to 5 feet per second.

In hydrocarbon synthesis reactions one difficulty encountered is that the carbon formation on the catalyst increases. This is particularly serious in a fluidized process. One result of carbon formation is that the catalyst disintegrates into fine carbonized particles which tend to become more buoyant and thus are removed from the reaction zone with the product gases. Furthermore, as the carbon concentration on the catalyst increases, the activity of the catalyst decreases and must ultimately be replaced. Another detrimental effect of carbon formation is the loss in heat transfer within the catalyst bed and the resulting formation of hot spots in the bed due to increased difficulty in temperature control within the bed. The resulting hot spots tend to cause undesired side reactions and excessive cracking of the hydrocarbons to give methane as a by-product. Various suggestions have been directed towards solving this problem. For example, it has been suggested that high pressures be employed in the hydrocarbon synthesis zone. It has also been suggested that various recycling techniques be employed. These proposals have not been entirely successful.

However, I have now discovered a process which will decrease the attrition of the catalyst in the hydrocarbon synthesis zone. In accordance with my invention, I employ a non-carbiding base material for the catalyst. On this non-carbiding base material I place a thin metal coating of the desired catalyst which is usually selected from the group consisting of iron, cobalt, or nickel. I prefer that the bulk density of the non-carbiding base material be about one; that the base material have a spherical configuration and that it also have a high heat conductivity. The base material which I employ has a co-efficient of thermal expansion approaching that of the active catalyst, as for example, iron. Suitable base materials are for example, clays, silica gels, carbon and metals with or without etched surface as for example, aluminum.

As pointed out heretofore, the active catalyst placed as surface coating on my base material is preferably selected from iron group metals consisting of iron, cobalt and nickel. The active catalyst coating may also contain promoters such as potassium salts, sodium salts, difficultly reducible oxides, such as thoria and alumina and metals as for example, copper and silver. Suitable other promoters are, for example, manganese, potassium carbonate, sodium carbonate and the like.

Although I may employ any suitable procedure for the preparation of my catalyst, I prefer to utilize the metal spraying technique. The spraying step may be conducted in either a reducing or oxidizing atmosphere. When a promoter is desirable, it is preferred to introduce the promoter to the base material along with the active catalytic ingredient.

The process of my invention is not to be limited by any theory as to mode of operation but only in and by the following claim in which it is desired to claim all novelty insofar as the prior art permits.

I claim:

An improved hydrocarbon synthesizing catalyst formed by spraying molten iron, containing a promotional amount of an activating material, onto spherical particles of aluminum in a reducing atmosphere thereby to form a thin coating of said iron on said aluminum particles.

FRED J. BUCHMANN.

REFERENCES CITED

The following references are of record in the file of this patent:

UNITED STATES PATENTS

| Number | Name | Date |
| --- | --- | --- |
| 1,043,580 | Eldred | Nov. 5, 1912 |
| 1,151,003 | Ell's | Aug. 24, 1915 |
| 1,672,308 | Downs | June 5, 1928 |
| 1,984,380 | Odell | Dec. 18, 1934 |
| 2,167,004 | Pier et al. | July 25, 1939 |
| 2,254,806 | Michael | Sept. 2, 1941 |

FOREIGN PATENTS

| Number | Country | Date |
| --- | --- | --- |
| 50,969 | Sweden | Feb. 15, 1922 |
| 408,067 | Great Britain | Apr. 5, 1934 |

OTHER REFERENCES

Meta Layer (periodical), July 16, 1937.